Feb. 4, 1969 R. W. GIFFORD 3,426,311

TRANSITION DEVICE

Filed June 16, 1966 Sheet 1 of 2

ROSS W. GIFFORD
INVENTOR

BY
BUCKHORN, BLORE, KLARQUIST & SPARKMAN
ATTORNEYS

ROSS W. GIFFORD
INVENTOR
BY
BUCKHORN, BLORE, KLARQUIST & SPARKMAN
ATTORNEYS

United States Patent Office 3,426,311

Patented Feb. 4, 1969

3,426,311

TRANSITION DEVICE

Ross W. Gifford, Beaverton, Oreg., assignor to Tektronix, Inc., Beaverton, Oreg., a corporation of Oregon Filed June 16, 1966, Ser. No. 557,934

U.S. Cl. 339—17 13 Claims

Int. Cl. H01r *17/18, 13/54;* H05k *1/18*

This invention relates to a transition device and particularly to a transition device for connecting a coaxial transmission line to a strip line.

Modern electronic circuitry frequently employs printed or etched circuits even for relatively high frequency applications. A convenient form of transmission line suitable for use with etched circuits comprises a strip line including a first conductor supported by or deposited on an insulating substrate or circuit board, with shield plates located on either side of such conductor parallel to the insulating substrate. These shield plates form the ground return or other side of the transmission line. For input and output purposes, it is frequently desirable to couple a more conventional type of transmission line into the strip line configuration. The present invention relates to a transition device for coupling coaxial cable to a strip line.

The conversion from coaxial line to strip line presents the possibility of a discontinuity between the two lines as a result of the difference in shape and dimensions of the two lines even though both display the same matched characteristic impedance. A reasonably rigid and dimensionally accurate transition structure is desirable in order to attain a minimum electrical discontinuity device which is dependable, but such a rigid structure does not ordinarily permit convenient connection and disconnection of the two lines. Of course, a permanent connector could be permanently joined or soldered to the strip line, but it then becomes somewhat cumbersome to disassemble the strip line for maintenance without changing the critical spacing required at the transition.

It is therefore an object of the present invention to provide an improved transition device for coupling between coaxial line and strip line, which device accurately maintains dimension tolerances despite connection and disconnection of such device.

It is another object of the present invention to provide a transition device for connecting coaxial line to strip line which device permits the disassembly of the strip line and reassembly thereof in accurate position relative to the coaxial line.

It is another object of the present invention to provide a transition device for coupling coaxial line to strip line which device is self-jigging and selectively maintains the structure of both the lines in securely clamped relation.

It is a further object of the present invention to provide an improved transition device for coupling coaxial line directly to strip line wherein the two may be completely separated from one another.

Briefly, in accordance with the present invention, the transition device comprises means for clamping the outer conductor of the coaxial line in abutting relation with the ends of the shield plates of a strip line. This outer conductor is also provided with means for aligning the circuit board upon which the strip line's center conductor is located. This aligning means provides self-jigging for the circuit board and the center conductor supported thereon so that accurate positioning and repositioning of the structure is possible. The transition device may be substantially completely disconnected from the strip line leaving the strip line free for disassembly and maintenance purposes.

In accordance with a particular embodiment of the present invention, the shield conductors of the strip line include outlying tabs, and the outer conductor of the coaxial cable is secured by clamping means between such tabs and the ends of the strip line shield plates. The outer conductor of the coaxial line also includes an alignment slot for receiving the circuit board supporting the center conductor of the strip line and thereby provides means for accurately aligning the center board relative to the remaining structure.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements and in which:

Figure 1:
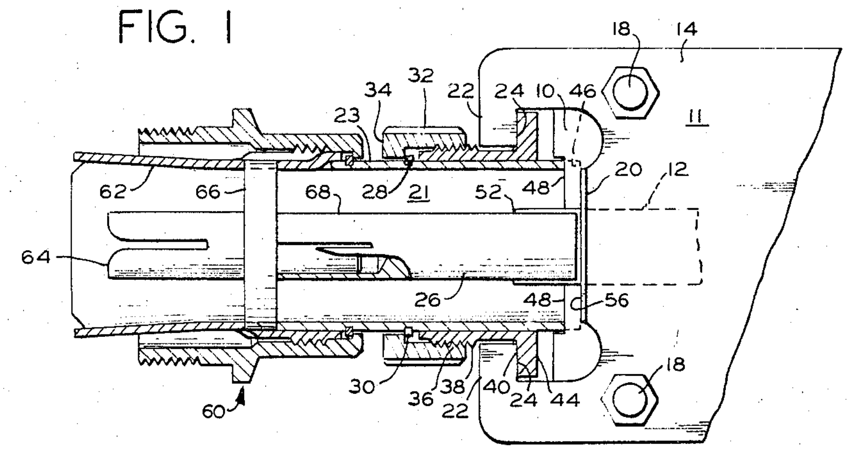
FIG. 1 is a plan view, partially in cross-section of a transition device in accordance with the present invention.

Referring to the drawings, a transition device according to the present invention securely anchors a coaxial line 21, forming a portion of the device, to a strip line 11 in a manner to provide a dependable, low-standing-wave-ratio transition despite connection and disconnection of the transition device, and despite disassembly of the strip line for maintenance of the circuit board which comprises part of the strip line. In the example illustrated, both the coaxial line and the strip line have a characteristic impedance of approximately 50 ohms. The outer conductor of the coaxial line has a diameter larger than the spacing between outer conductors or shield plates of the strip line, and the inner conductor of the coaxial line also has a diameter slightly larger than the center conductor of the strip line, in at least one radial direction. The transition device according to the present invention provides efficient stable coupling despite the differences in dimension and shape of the lines involved.

The strip line comprises a circuit board 10 composed of insulating material upon which is deposited a center conductor 12 which may be on one or both sides of the circuit board. Shield plates 14 are located on either side of circuit board 10 in spaced relation to center conductor 12 and these shield plates form the opposite or outer shield conductor of the transmission line. The shield plates 14 are spaced from the circuit board by means of spacers 16 through which machine screws 18 extend. The circuit board is adjustable relative to the shield plates and may be removed for maintenance purposes and the like and then reinserted. The circuit board may, of course, provide support for other circuitry and components to which the strip line provides an input or output.

The shield plates 14 come to an end defined by outwardly directed extensions 20 which provide an abutment for the outer conductor 23 of coaxial line 21 when the two are connected. The shield plates 10 are also each provided with anchor tabs 22, on either side of the extensions 20 and outside the diameter of outer conductor 23 of coaxial line 21. The anchor tabs extend in a direction forward of the strip line along the coaxial line. These tabs turn inwardly at their extremities to provide straight edges 24 parallel to and facing extensions 20.

Coaxial line 21 is engageable with strip line 11 in clamped aligned relation thereto. Coaxial line 21 comprises an inner centrally located conductor 26 and an outer conductor 23 including a circumferential groove 28 for receiving a spring retaining ring 30. A knurled coupling sleeve nut 32 receives outer conductor 23 therewithin and has an inwardly extending flange 34 abutting ring 30. Nut 32 is provided with an inwardly threaded portion 36 extending in the direction of strip line 11 for engaging threads 38 on jack plate 40, the latter also being mounted for rotation on outer conductor 23.

Figure 4:
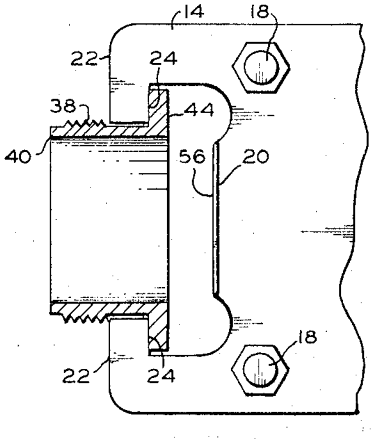
FIG. 4 is a plan view of shield plate portions of a strip line employed according to the present transition device shown in partial assembly with a transition device jack plate.
Figure 8:
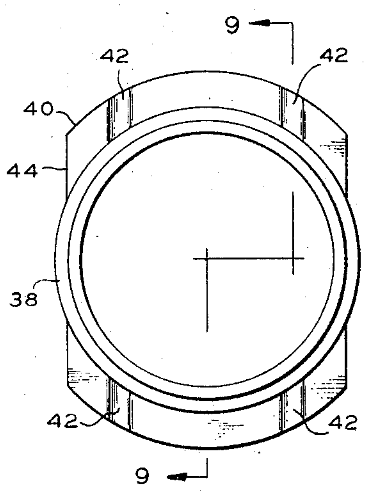
FIG. 8 is an end view of a jack plate portion of a transition device according to the present invention.
Figure 9:
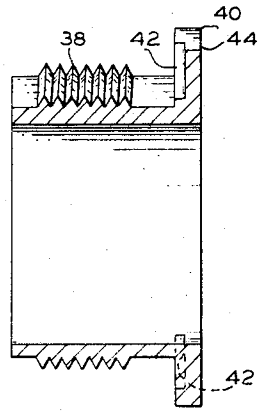
FIG. 9 is a side cross-sectional view of the FIG. 8 jack plate.

As can be seen more clearly in FIGS 8 and 9, jack plate 40 is provided with grooves or slots 42 on the underside of the head 44 of the jack plate. These slots are for mating with edges 24 of anchor tabs 22 as can be seen more clearly in FIGS 1 and 4. Head 44 of jack plate 40 has a first diameter sufficient for engaging anchor tabs 22 in slots 42, and a second diameter, 90° from the first diameter, which is substantially equal to or less than the diameter of the threads 38. Anchor tabs 22, where they extend towards one another, are spaced a sufficient distance to pass head 44 of the jack plate 40 when it is turned 90° with respect to what its position would be when engaging these tabs. Therefore, the head 44 may be turned to pass through the gap between tabs 22, and then rotated into an anchoring position when connection of the transition device is made according to the instant invention. As nut 32 is then drawn up towards the jack plate 40, with the head 44 located between extensions 20 and tabs 22, the assembly acts to move outer conductor 23 in a direction for securely engaging the outer conductor to extensions 20. The coaxial line 21 is thereby maintained in secure aligned connection with shield plates 14. Circuit board 10 is provided with a cutout detail defining edge 48 into which outer conductor 23 fits in such clamped position.

Figure 5:
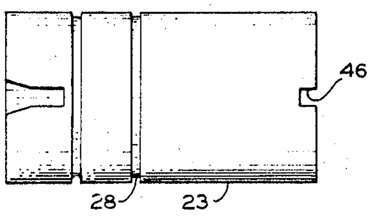
FIG. 5 is a side view of an outer conductor of a coaxial cable portion of a transition device according to the present invention.
Figure 6:
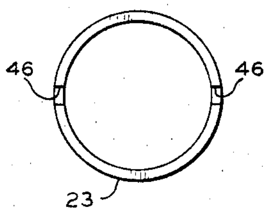
FIG. 6 is an end view of the FIG. 5 outer conductor.
Figure 7:
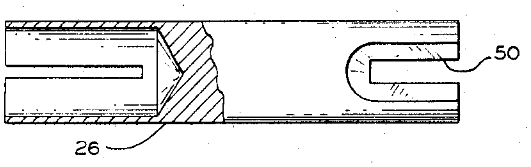
FIG. 7 is a side view of an inner conductor of a coaxial cable portion of a transition device according to the present invention.

The outer conductor 23 is provided with a pair of alignment slots 46 extending longitudinally from the end of the coaxial line abutting strip line 11, and these alignment slots are diametrically opposite one another as more clearly illustrated in FIGS. 5 and 6. These slots comprise means for aligning the circuit board and therefore the center conductor 12 carried thereon. These slots receive the edge of circuit board 10 at 48, in clamped position, as seen more clearly in FIG. 1.

Figure 2:
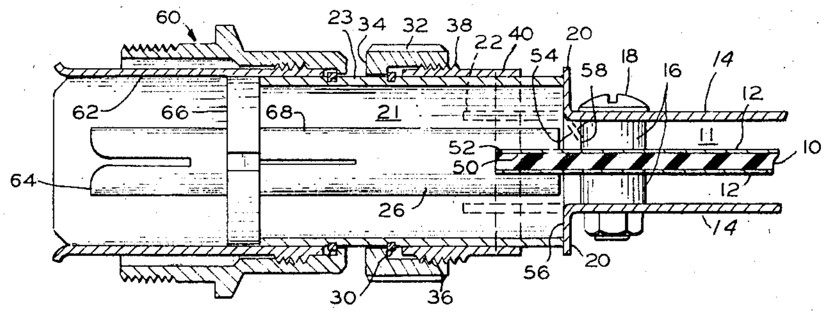
FIG. 2 is a cross-sectional elevation of a transition device in accordance with the present invention.
Figure 3:
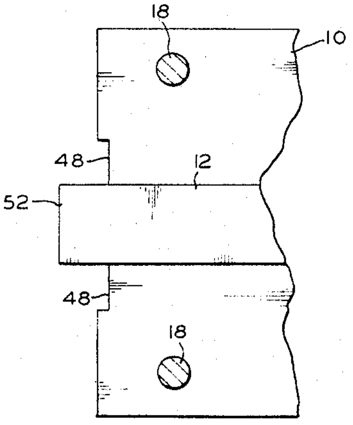
FIG. 3 is a plan view of a circuit board including a center conductor forming a part of the strip line in accordance with the present transition device.

When the outer conductor 23 is securely clamped to anchor tabs 22 of plates 14 and circuit board 10 is aligned in slots 46 of outer conductor 23, the center conductor 12 of the strip line will be aligned with inner conductor 26 of the coaxial line. Inner conductor 26 is provided with a slot 50 for receiving the end of center conductor 12. The slot is of the correct size to make electrical contact with center conductor 12 as supported on one or both surfaces of an extension 52 of circuit board 10. Center conductor 12 has substantially the same width as the diameter of inner conductor 26, but, as can be seen from FIG. 2, the vertical dimension of the circuit board 10 with one or more conductors 12 thereon is less than the diameter of inner conductor 26. The end 54, of inner conductor 26 is accurately positioned, in the device according to the present invention, to be a few thousandths of an inch in an axial direction from faces 56 of extensions 20. The exact position of point 54 is suitably found empirically so that the lowest voltage standing wave ratio results. End 54 is, however, preferably located in an axial direction toward coaxial line 21 from strip line 11, so as to achieve a good transition from one transmission system to the other. Electrical capacitance is effectively established between end 54 and face 56 of extensions 20 as, for example, indicated by dashed lines at 58 in FIG. 2. This capacitance is a bridging element between the lines to provide an effective gradual change in inter-conductor capacitance, rather than an abrupt one. The dimensional accuracy between end 54 and face 56 is accurately maintained in the device according to the present invention so the correct value will be realized despite disconnection of the transition device and disassembly of the strip line.

The inner conductor 26 of line 21 as well as outer conductor 23 are joined at ends thereof remote from the strip line connection to an extended coaxial transmission line or cable. Connection to such transmission line or cable can be achieved through a conventional coupling device 60, which forms no part of the present invention. Briefly, this coupling device may include an outer conductor 62 and an inner conductor 64 spaced therefrom by means of an insulating spacer 66. The device 60 engages outer conductor 23 while inner conductor 64 terminates in a stub which plugs into inner conductor 26 at 68.

In first assembling the device according to the present invention, shield plates 14 are attached to circuit board 10 by means of screws 18 but the screws are not tightened at this time. The outer conductor 23 and jack plate 40 is inserted over outer conductor 23 in such a manner that threads 28 engage with threaded portion 36 of nut 32.

The coaxial line is then secured to the strip line in the following manner. Jack plate 40 is rotated on outer conductor 23 to a position to miss tabs 22 of shield plates 14 and the outer conductor 23 is extended between tabs 22. Now the outer conductor 23 is rotated until slots 46 engage edge 48 of circuit board 10. Jack plate 40 is rotated so that slots 42 of head 44 may engage edges 24 of tabs 22. Nut 32 is tightened towards jack plate 40 to urge and secure the outer conductor 23 firmly towards extensions 20. Now, circuit board 10 is pressed as far as possible into slots 46 in outer conductor 23 and screws 18 are then tightened. There is thus included a basic self-jigging procedure that is followed whenever the strip line is taken apart, as for maintenance of circuitry located on circuit board 10. It is noted that circuit board 10 can be removed and then reinserted in the strip line without unsoldering any connections and without changing the configuration of the transition device. It is merely necessary to again jig the circuit board into the transition device as above described. The unit is self-jigging within two thousandths of an inch. Of course, the transition device according to the present invention may be connected, and disconnected by reversing the above procedure, without disassembling the circuit board from the strip line or untightening screws 18. The transitional configuration, and particularly the longitudinal spacing between end point 54 and faces 56 of extensions 20 is maintained accurately at all times due to the secured clamping action and self-jigging features of the present device.

It is generally desirable for enhanced accuracy that center conductor 26 be permanently soldered to extension 52 of circuit board 10. Then, when the transition device is connected and disconnected, the center conductor plugs and unplugs at location 68 rather than at the juncture between the coaxial line and strip line. Again, however, the positioning of end point 54 is maintained relative to face 56, when the device is connected and disconnected and even if circuit board 10 is removed for maintenance. When circuit board 10 is so removed, it is again urged as far as possible within slots 46 in outer conductor 23 with the transition device according to the present invention clamped in place and screws 18 are tightened to insure the correct positioning of end point 54 relative to faces 56 of each extension 20 of the strip line's shield plates.

This transition device according to the present invention exhibits minimum of signal reflection and distortion over a frequency range of several gigacycles. It also provides a rigid mechanical structure capable of very low signal-to-noise ratio. A minimum of two such transition devices may be passed with a maximum of 1 percent signal distortion from D.C. to a frequency of five gigacycles. The standing wave ratio is so low that it is difficult to detect a discontinuity with usual measuring equipment.

While I have shown and described a principal embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A transition device for coupling a coaxial cable to a strip line wherein said coaxial cable includes concentric inner and outer conductors and wherein said strip line comprises a circuit board supportng a center conductor and shield plates on either side of said circuit board in shielding relation to said center conductor, said transition device comprising:

clamping means for removably securing the outer conductor of said coaxial cable in abutting relation to ends of said shield plates with said inner conductor in aligned relation with said center conductor, said outer conductor of said coaxial cable being provided with means for aligning said circuit board supporting said center conductor so that said center conductor is accurately positioned to space the inner conductor of said coaxial cable at a predetermined position relative to the ends of said shield plates.

2. The transition device according to claim 1 wherein the said circuit board is adjustable relative to said shield plates.

3. The device according to claim 1 wherein said shield plates are provided with securing tabs extending outside the outer dimension of said coaxial cable, said clamping means being engageable with said securing tabs for urging said outer conductor from said tabs toward the said ends of said shield plates.

4. The device according to claim 1 wherein said means for aligning said circuit board comprises diametrically opposite slots in the end of the outer conductor of said coaxial cable for engaging said circuit board.

5. A transition device for removably joining a coaxial line to a strip line wherein said coaxial line includes inner and outer conductors and wherein said strip line comprises a center conductor and shield conductors, said transition device comprising:

securing tab means integral with said shield conductors, and clamping means for selectively engaging said tab means to urge said coaxial line toward said strip line in secure coupling relation, said device being further provided with means for aligning and positioning said center conductor of said strip line relative to the inner conductor of said coaxial line when said lines are joined in secure coupling relation.

6. The device according to claim 5 wherein said strip line is provided with a circuit board between said shield conductors for supporting said center conductor and wherein said means for aligning and positioning said center conductor comprises a slotted edge of said outer conductor for engaging said circuit board when said lines are joined in secure coupling relation.

7. A transition device for coupling a coaxial line of a given diameter and having an inner conductor and an outer conductor, to a strip line including an insulating center board supporting a center conductor and shield plates on either side thereof wherein the spacing between said shield plates is less than the diameter of the outer conductor of said coaxial line, the center conductor of the coaxial line having a larger diameter than the center conductor of said strip line in at least one radial direction, said device comprising:

a sleeve nut adapted for rotation about the said outer conductor of said coaxial line in fixed longitudinal relation thereto, said nut being threaded at the end thereof toward said strip line, said shield plates having securing tabs which extend around the end of said coaxial outer conductor and inwardly towards one another from outside the outer diameter of said coaxial line, a jack plate having a threaded coupling for engaging said sleeve nut and disposed for rotation about said outer conductor between said sleeve nut and said strip line, said jack plate being adapted to engage said tabs to draw said outer conductor toward the ends of the shield plates of said strip line as said nut and said threaded coupling are tightened toward one another, said outer conductor being provided with means for aligning the center board of said strip line, including said center conductor, relative to the inner conductor of said coaxial line, said transition device accurately positioning the juncture of said center conductor and said inner conductor relative to the juncture of the outer conductor with the ends of said shield plates to provide a minimum electrical discontinuity.

8. The device according to claim 7 wherein the juncture of said inner conductor and said center conductor is spaced towards said coaxial line from the juncture between said outer conductor and the ends of said shield plates.

9. The device according to claim 7 wherein the ends of said shield plates have outwardly extending substantially flat extensions defining the ends of said shield plates.

10. The device according to claim 7 wherein said jack plate is provided with slots for receiving said securing tabs.

11. The device according to claim 7 wherein said means for aligning said center board comprises longitudinal diametrically opposed slots in the outer conductor of said coaxial line for engaging said center board.

12. The device according to claim 7 wherein spacers separate the center board from said shield plates and wherein said center board is moveable relative to said shield plates for maintenance purposes while being returnable to accurate alignment with said transition device as a result of the aligning action of said means for aligning said circuit board.

13. The device according to claim 7 wherein said jack plate has a first diameter sufficient for engaging said tabs and a second diameter 90° from said first diameter which is less than the spacing between inwardly extending portions of said tabs so that said jack plate is insertable between said tabs and the ends of said shield plates for rotatable engagement with said tabs.

References Cited

UNITED STATES PATENTS

| | | | |
|---|---|---|---|
| 2,946,024 | 7/1960 | Mills | 333—84 X |
| 2,946,024 | 7/1960 | Mills | 333—84 X |

FOREIGN PATENTS

| | | |
|---|---|---|
| 1,232,014 | 4/1960 | France. |

MARVIN A. CHAMPION, *Primary Examiner.*

PATRICK A. CLIFFORD, *Assistant Examiner.*

U.S. Cl. X.R.

333—84, 97; 339—177

UNITED STATES PATENT OFFICE

CERTIFICATE OF CORRECTION

Patent No. 3,426,311 February 4, 1969

Ross W. Gifford

It is certified that error appears in the above identified patent and that said Letters Patent are hereby corrected as shown below:

Column 6, line 61, 2,946,024 7/1960 Mills ------ 333-84X should read 3,201,722 8/1965 May et al. - 339-17X Signed and sealed this 24th day of March 1970.

(SEAL)
Attest:

Edward M. Fletcher, Jr.
Attesting Officer

WILLIAM E. SCHUYLER, JR.
Commissioner of Patents